United States Patent Office 3,637,810
Patented Jan. 25, 1972

3,637,810
ARYL N-SUBSTITUTED N-(1-CHLORO-1-ALKENYL) CARBAMATES
Henri Ulrich, Northford, and Benjamin W. Tucker, Bethany, Conn., assignors to The Upjohn Company, Kalamazoo, Mich.
No Drawing. Filed Oct. 22, 1968, Ser. No. 769,719
Int. Cl. C07c 125/06
U.S. Cl. 260—479 C
9 Claims

ABSTRACT OF THE DISCLOSURE

Novel aryl N-substituted N-(1-chloro-1-alkenyl)carbamates are disclosed. These compounds are prepared by the condensation of substituted or unsubstituted phenols with N-substituted-N-(1-chloro-1-alkenyl)carbamoyl chlorides in the presence of a tertiary amine and an inert organic solvent. The aryl N-substituted-N-(1-chloro-1-alkenyl)-carbamates so obtained are useful (1) as insecticides against a variety of insects typical of which are the Mexican bean bettle, the housefly, the housecricket, the boll weevil, and the confused flour bettle and (2) as chemical intermediates for the preparation of known insecticides and of thermoplastic polymers.

BACKGROUND OF THE INVENTION

(1) Field of the invention

This invention relates to novel organic chemical compounds and to processes for their preparation, and is more particularly concerned with novel aryl N-substituted-N-(1-chloro-1-alkenyl-carbamates, and with the use of these novel compounds as insecticides and as chemical intermediates.

(2) Description of the prior art

Aryl N-alkylcarbamates are a well known class of chemical compounds exhibiting insecticidal activity, see, for example, D. E. H. Frear, "Pesticides Handbook," College Science Publishers, State College, Pa. (1964).

The preparation and insecticidal activity of a limited class of aryl carbamates containing unsaturated side chains is also well-known in the art, see for example, Belgium Pats. 615,364 and 620,357; French Pat. 1,439,118 and German Pats. 1,142,599 and 1,183,490. However, aryl - N - substituted - N-(1-chloro-1-alkenyl-carbamates have not been described hitherto.

We have now found that these novel compounds are particularly useful insecticides. In addition we have found that the novel compounds of the invention are useful as chemical intermediates. For example, they can be employed as starter monomers in the preparations of homo- and co-polymers. They can also be employed as intermediates in the preparation of known aryl N-alkylcarbamate insecticides. This latter finding is of value in that it provides a novel and useful route to said aryl N-alkylcarbamate. Hitherto the latter have required the use of toxic aliphatic isocyanates as intermediates in their preparation. Such hazards con now be avoided.

SUMMARY OF THE INVENTION

The novel compounds of the invention are represented by the following structural formula:

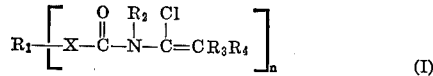

(I)

wherein $n$ is an integer from 1 to 2, $R_1$ has a valency corresponding to the value of $n$ and is selected from the class consisting of aryl and substituted aryl, $R_2$ is selected from the class consisting of lower-alkyl, aryl and substituted aryl, $R_3$ and $R_4$ are selected from the class consisting of hydrogen, alkyl containing from 1 to 18 carbon atoms, aryl and substituted aryl, and X is selected from the class consisting of oxygen and sulfur; and wherein said substituents in said substituted aryl are selected from the class consisting of lower-alkyl, lower-alkoxy, lower-alkylthio, lower-acyloxy, halo, nitro and cyano.

The novel compounds of the invention corresponding to Formula I above are useful for a variety of purposes. Illustratively, the compounds of Formula I can be used as chemical intermediates in the preparation of thermoplastic homo- and co-polymers, using procedures such as that described in, for example, U.S. Pat. 3,207,731 and British Pat. 834,575. The compounds of Formula I are also useful as intermediates in the preparation of known insecticides, such as the aryl N-alkylcarbamates (e.g. α-naphthyl N-methylcarbamate), which will be exemplified hereinafter.

In a particular aspect of the invention the novel aryl N-substituted-N-(1-chloro-alkenyl)carbamate of Formula I can also be used as insecticides as will be emplified and described hereinafter.

The term "aryl" is used throughout this specification and claims thereof in its conventionally accepted sense as meaning the residue obtained by removing a hydrogen atom from a nuclear carbon atom of an aromatic hydrocarbon, preferably one containing from 6 to 12 carbon atoms, inclusive. The aryl residue can be unsubstituted, i.e., can be free of substituents other than those comprising carbon and hydrogen or it can be substituted by one or more substituents which are inert under the conditions of the process of the invention. An important criterion with regard to the inert substituents of the aryl residue is that they do not contain active hydrogen atoms in the Zerewitinoff sense, see for example, J. Am. Chem. Soc., 49, 3181 (1927). Inclusive of such substituents are lower-alkyl, lower-alkylthio, lower-acyloxy, halo, cyano and nitro. Other terms as used throughout this specification and claims thereof are defined as follows: "alkyl" means an alkyl radical containing from 1 to 18 carbon atoms such as methyl, ethyl, propyl, butyl, pentyl, hexyl, heptyl, octyl, nonyl, decyl, undecyl, dodecyl, pentadecyl, octadecyl and isomeric forms thereof; "lower alkyl" means an alkyl radical containing from 1 to 8 carbon atoms such as methyl, ethyl, propyl, butyl, pentyl, hexyl, heptyl, octyl and isomeric forms thereof; "lower alkoxy" means alkoxy containing from 1 to 8 carbon atoms such as methoxy, ethoxy, propoxy, butoxy, pentoxy, hexyloxy, heptyloxy, octyloxy and isomeric forms thereof; "lower alkylthio" means alkylthio containing from 1 to 8 carbon atoms such as methylthio, ethylthio, propylthio, butylthio, pentylthio, hexylthio, heptylthio, octylthio and isomeric forms thereof; "halo" means fluoro, chloro, bromo and iodo; "lower-acyloxy" means acyloxy containing from 1 to 8 carbon atoms such as acetoxy, propionyloxy, butyryloxy, valeryloxy, hexanoyloxy, heptanoyloxy, octanoyloxy and isomeric forms thereof.

DETAILED DESCRIPTION OF THE INVENTION

The novel compounds corresponding to Formula I above are readily prepared in a two step synthesis by first employing the well-known condensation of an N-substituted amide of the formula:

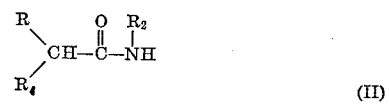

(II)

(wherein $R_2$, $R_3$ and $R_4$ are as defined above) with phosgene to form the corresponding N-substituted-N-(1-chloro - 1 - alkenyl)carbamoyl chloride of the formula:

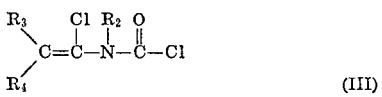

(III)

wherein $R_2$, $R_3$ and $R_4$ are defined hereinabove. The procedure employed in the above reaction is advantageously that described by Ottenheym et al. in U.S. Pat. 3,152,175.

The second step involved in the synthesis of the compounds of Formula I comprises reacting the thus formed carbamoyl chloride (III) with the appropriate phenol $R_1XH$ (IV), wherein $R_1$ and $X$ are as defined above, advantageously in the presence of a tertiary amine to facilitate the removal of hydrogen chloride. The tertiary amine is generally employed in an amount corresponding to a slight excess over the stoichiometric amount required to react with the evolved hydrogen chloride.

The second step in the two step synthesis of the novel compounds (I) is carried out in accordance with well-known procedures for the condensation of phenols and carbamoyl chlorides, to yield the corresponding aryl carbamates; see, for example, "Chemistry of Carbon Compounds," edited by E. H. Rodd, volume IIIa, page 431, Elsevier Publishing Corporation, New York (1951).

If desired the two steps in the above reaction can be carried out sequentially without isolation or purification, other than removal of excess phosgene, of the carbamoyl chloride (III).

The order or manner in which the various reactants are brought together in the first or second step of the reaction is not critical. It has been found advantageous, however, to conduct the reaction in the presence of an anhydrous inert organic solvent, i.e. a solvent which does not enter into reaction with the reactants or interfere in any other way with the course of the desired reaction. Illustrative of such inert organic solvents are benzene, toluene, the xylenes, cumene, mesitylene, heptane, octane, chlorobenzene, o-dichlorobenzene, tetrachloroethane, dimethylformamide, dioxane and the like. As will be obvious to one skilled in the art, the choice of solvent for any particular reaction is primarily dependent upon the desired reaction temperature.

The proportions of reactants employed in the synthesis of the compounds (I) are not critical in the sense that the novel compounds (I) will be obtained whatever the relative proportions employed. Generally speaking, however, in order to obtain reasonable yields of the compounds (I) it is desirable to employ an excess over the stoichiometric proportion of phosgene in the first step and approximately equimolar proportionn of the reactants in the second step of the process of the invention.

The temperature at which the reactants are brought together in the first step of the reaction (i.e. the N-substituted amide (II) and phosgene) is advantageously at or slightly below ambient temperature and is usually within the range of about −5° C. to about 150° C. Higher temperatures can be employed, if desired, especially in instances where the rate of reaction is relatively slow at ambient temperature. In the second step of the preparation of the compounds (I) the reaction is most conveniently carried out at the refluxing temperature of the particular solvent employed.

The time required for each of the reactions to proceed to the desired end point can vary from a few minutes to several hours, and is usually determined empirically, depending upon the reaction temperature and the particular combination of reactants being used. The progress of the reaction can be followed by well-known analytical procedures. For example, aliquots can be removed from the reaction flask periodically during the process of the reaction and subjected to spectroscopic analysis such as infra-red or nuclear magnetic resonance analysis or to vapor phase chromatography and the like.

Once the desired end point has been reached, as determined by one or more of the above analytical procedures, the products are isolated from the reaction mixture by conventional procedures known in the art. For example, when the products are liquid or are soluble in the reaction solvent they can be isolated by simple vacuum distillation of the reaction solvent. When the products separate as solids from the reaction mixture they can be isolated by separation techniques such as filtration, centrifugation and the like, and dried. Further purification of the products can be carried out employing extractive or crystallization methods in the case of solids or fractional distillation under reduced pressure in the case of liquids.

The tertiary amines which can be used as hydrogen chloride scavengers in the second step of the prepartion of the novel N-substituted - N - (1 - chloro - 1 - alkenyl)-carbamates (I) can be any of those conventionally employed for these purposes. Typical of said tertiary amines are: trimethylamine, triethylamine, triethylene diamine, N,N,N',N' - tetramethylethylenediamine, N,N,N',N'-tetraethylethylenediamine, N,N,N',N' - tetramethylguanidine, N,N,N',N' - tetramethyl - 1, 3 - propanediamine, N-methylmorpholine, N - ethylmorpholine, N,N'-dimethylcyclohexylamine, N,N' - diethylcyclohexylamine and the like.

The amides (II) which are employed as starting materials in the preparation of the compounds (I) of the invention are, for the most part, well-known in the art and are generally obtained by the interaction of the appropriate acid chloride and a primary amine; see for example, E. H. Rodd, ibid. volume Ia, page 39.

Illustrative of N-substituted aliphatic acid amides which fall within the class of Formula II above are those acid amides containing from 1 to 18 carbon atoms such as: N-methyl-, N-ethyl, N-phenyl, and N-2,4,6-mesitylacetamide; N-methyl-, N-octyl-, N-paratolyl-, and N-2,5-xylylbutyramide; N-methyl-, N-butyl-, N-metatolyl-, and N-2,4,6-mesitylcaproamide; N-pentyl-, N-octyl-, N-phenyl-, and N-paratolylheptanoamide; N-methyl-, N-heptyl-, N-octyl-, N-phenyl-, and N-metatolylpelargonamide; N-propyl-, N-octyl-, N-phenyl-, N-orthotolyl-, and N-2,3-xylylundecanamide; N-methyl-, N-pentyl-, N-octyl, N-phenyl-, and N-metatolylmyristamide; N-methyl-, N-heptyl-, N-octyl-, N-phenyl-, and N-orthotolylstearamide; N-ethyl-, N-octyl-, N-phenyl-, and N-metatolylmargaramide; N-methyl-, N-propyl-, N-octyl-, and N-phenyloctadecanoamide; N-methyl-, N-octyl-, N-phenyl-, N-orthotolyl-, N-2,3-xylyl-, and N-2,4,6-mesitylphenylacetamide; N-methyl-, N-pentyl-, N-octyl-, N-phenyl-, N-orthotolyl-, and N-2,3-xylyl-1-phenylpropionamide; N-methyl-, N-heptyl-, N-octyl-, N-phenyl-, and N-paratolyl-1-(3,5-xylyl)propionamide; N-2,3-xylyl 2-phenylbutyramide; N-phenyl-1-phenylvaleramide; N-methyl-, and N-phenyl-1-paratolylvaleramide; N-methyl-, and N-phenyl-1-phenylcaproamide; N-phenyl-1-phenylheptanamide; N-methyl-, and N-phenyl-1-phenyloctadecanoamide; N-methyl-, and N-phenyl-1-naphthylacetamide; N-methyl-, and N-phenyl-1,1-diphenylacetamide; N-methyl-, and N-phenyl-1,1-diphenylpropionamide; N-methyl-, and N-phenyl-1,1-diphenyloctadecanoamide, and the like.

The phenols (IV) which are employed in the second step of the preparation of the compounds (I) of the invention are selected from the class consisting of substituted and un-substituted mononuclear and fused ring homocyclic phenols and thiophenols, wherein said substituted phenols contain at least one substituent selected from the class consisting of lower-alkyl, lower-alkoxy, lower-alkylthio, lower-acyloxy, halo, nitro and cyano. Typical of said phenols are: phenol, para-cresol, para-chlorophenol, sym-m-xylenol, para-tertiary-butylphenol, thiophenol, para-thiocresol, para-chlorothiophenol, 1-naphthol, 2-naphthol, 1-thionaphthol, 2-thionaphthol, resorcinol, hydroquinone, pyrocatechol, phloroglucinol, and p-cyanophenol, p-acetoxyphenol, and dihydroxyanphthalene, inclusive of the 1,2-, 1,3-, 1,5-, 1,6-, 1,7-, 1,8-, 2,3- 2,6-, 2,7- and 2,8- is isomers thereof.

As previously mentioned, the novel compounds (I) of the invention can be employed as intermediates, by hydrolysis or solvolysis, in the preparation of the corresponding aryl N-substituted carbamates (a known class of insecticides, see British Pat. 841,141). For example, hydrolysis of the compounds (I) of the invention to the corresponding carbamate first involves hydrolysis to the acyl derivative and further hydrolysis to the carbamate as follows:

$$R_1 \!-\!\!\left(\!X - \overset{O}{\underset{\|}{C}} - \overset{R_2}{\underset{|}{N}} - \overset{Cl}{\underset{|}{C}} = CR_3R_4\right)_n$$

$$\downarrow H_2O$$

$$R_1 \!-\!\!\left(\!X - \overset{O}{\underset{\|}{C}} - \overset{R_2}{\underset{|}{N}} - \overset{O}{\underset{\|}{C}} - CR_3R_4\right)_n$$

$$\downarrow H_2O$$

$$R_1 \!-\!\!\left(\!X - \overset{O}{\underset{\|}{C}} - \overset{R_2}{\underset{|}{N}}H\right)_n$$

wherein $R_1$, $R_2$, $R_3$, $R_4$, X and $n$ have the meaning hereinbefore defined. Thus, the appropriate compound (I) of the invention is slowly added, with stirring, to a stoichiometric excess of water, at room temperature (20–30° C.), in a suitable reaction flask equipped with a means of trapping hydrogen chloride. After several minutes there is an exothermic reaction and an apparent evolution of hydrogen chloride. Filtration and trituration of the thus isolated solid with a suitable solvent affords the corresponding aryl N-substituted carbamate (VI).

Solvolysis of the aryl N-substituted-N-(1-chloro-1-alkenyl)carbamate (I) of the invention to the corresponding aryl N-substituted carbamate (VI) is carried out in accordance with the following equation:

$$R_1 \!-\!\!\left(\!X - \overset{O}{\underset{\|}{C}} - \overset{R_2}{\underset{|}{N}} - \overset{Cl}{\underset{|}{C}} = CR_3R_4\right)_n \longrightarrow R_1 \!-\!\!\left(\!X - \overset{O}{\underset{\|}{C}} - \overset{R_2}{\underset{|}{N}}H\right)_n$$
$$(I) \qquad\qquad (VI)$$

wherein $R_1$, $R_2$, $R_3$, $R_4$, X and $n$ have the meaning hereinabove defined.

The process of solvolyzing the novel compounds (I) of the invention to the corresponding aryl N-substituted carbamate insecticides (VI) of the art involves dissolving the appropriate aryl N-substituted-N-(1-chloro-1-alkenyl) carbamate in a stiochiometric excess of a lower alkanol such as methanol, ethanol, propanol, isopropanol, butanol, isobutanol and the like. This admixture is then refluxed for a period of time sufficient to convert the aryl N-substituted-N-(1-chloro-1-alkyenyl)carbamate (I) to the corresponding aryl N-substituted carbamate. The time and temperature required for such a conversion is solely dependent upon the alkanol being used, and is readily determined empirically. A convenient method of determining the completion of the reaction is by conventional analytical spectroscopic procedures described hereinabove.

The novel compounds (I) of the invention can be polymerized by themselves or co-polymerized with other alkenyl compounds such as styrene, alphamethylstyrene, vinyl toluene, vinyl chloride, methyl methacrylate, acrylonitrile and the like in the presence of free radical, anionic and cationic catalysts, using the procedure described, for example, in U.S. Pat. 3,207,731, British Pat. 834,575 and P. J. Flory, "Principles of Polymer Chemistry," Cornell University Press, Ithaca, N.Y. (1953). Generally speaking, polymerization is carried out by charging the appropriate starter monomer(s) into a pressure flask in the presence of a catalys and an inert organic solvent. The temperature and pressure employed in the reaction is primarily dependent upon the type of polymer being prepared, The resulting polymer is isolated from the reaction medium by stripping the inert organic solvent. The polymers so prepared are useful in adhesive formulations and in the preparation of fabricated articles by extrusion or injection molding techniques.

The following examples illustrate the preparation of the novel compounds of the invention and set forth the best mode contemplated by the inventors of carrying out the invention. These examples are not to be construed as limiting.

EXAMPLE 1

This example illustrates the preparation of N-substituted N-(1-chloro-1-alkenyl)carbamoyl chloride intermediates used in the preparation of the novel compositions of the invention:

To a reaction flask equipped with a stirrer, reflux condenser and calcium chloride drying tube, containing 200 grams (2.02 moles) of phosgene dissolved in 450 ml. of anhydrous benzene at 21–29° C. was added, with stirring, 36.8 grams (0.5 mole) of N-methylacetamide. After heating the contents of the flask to about 80–85° C. over a period of 30 minutes, the excess phosgene was removed by bubbling nitrogen below the liquid level of the reactants in the flask. The benzene was then distilled off employing a steam bath and Rotavapor evaporator at a pressure of 20 mm. The residue was vacuum distilled to yield 60.25 g. (78.3% of theory) of N-methyl-N-(1-chlorovinyl)carbamoyl chloride as a liquid having a boiling point of 58° C. at a pressure of 4.8 mm. Infrared analysis of the compound (5% solution in benzene) showed maxima at 1739 cm.$^{-1}$ and 1664 cm.$^{-1}$ indicating carbonyl and vinyl absorptions respectively. Confirmation of the structure was carried out employing nuclear magnetic resonance spectra (NMR) using the compound as a 30% solution in carbon tetrachloride. The NMR spectra showed two singulet peaks at 3.2 p.p.m. and 5.2 p.p.m. indicating the N-methyl proton and vinyl proton absorptions respectively having an integral proton ratio of 3:2.

Following the same procedure as above but replacing N-methylacetamide by:

N-methyl propionamide,
N-methyl butyramide,
N-methyl nonadecanoamide,
N-methyl phenylacetamide,
N-ethyl acetamide,
N-octyl acetamide,
N-phenyl acetamide,
N-paratolyl acetamide,
N-methyl-1,1-diphenylacetamide,
N-methyl isopropylacetamide, and
N-hexyl paratolylacetamide, there were obtained the following:

N-methyl-N-(1-chloro-1-propenyl)-,
N-methyl-N-(1-chloro-1-butenyl)-,
N-methyl-N-(1-chloro-1-nonadecenyl)-,
N-methyl-N-(1-chloro-styryl)-,
N-ethyl-N-(1-chlorovinyl)-,
N-octyl-N-(1-chlorovinyl)-,
N-phenyl-N-(1-chlorovinyl)-,
N-paratolyl-N-(1-chlorovinyl)-,
N-methyl-N-(1-chloro-2,2-diphenylethenyl)-,
N-methyl-N-(1-chloroisobutenyl)-, and
N-hexyl-N-(1-chloro-p-methylstyryl)-carbamoyl chloride, respectively.

EXAMPLE 2

Preparation of phenyl N-methyl-N-(1-chlorovinyl) carbamate

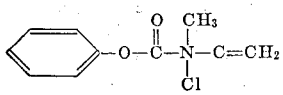

Into a three neck, 500 ml. round bottom flask equipped with a mechanical stirrer, heating mantle, thermometer and reflux condenser containing 200 ml. of anhydrous benzene was added 14.3 grams (0.15 mole) of phenol, 27.3 grams (0.27 mole) of triethylamine and 23.1 grams (0.15 mole) of N-methyl-N-(1-chlorovinyl)carbamoyl chloride (prepared as described in Example 1). After refluxing the reaction mixture at 80 to 85° C. for 2 hours, and cooling to room temperature (23–25° C.), 19.9 grams (96% theoretical) of precipitated triethylamine hydrochloride were removed by filtration. The benzene was then removed from the filtrate employing a steam bath and Rotavapor evaporator at a pressure of 20 mm. The residue was triturated with diethyl ether to remove the remaining triethylamine hydrochloride and the ether distilled off to yield 28.83 grams (91.2% of theoretical yield) of liquid phenyl N-methyl-N-(1-chlorovinyl)carbamate having a boiling point of 86° C. at 0.005 mm. mercury pressure.

*Analysis.*—Calcd. for $C_{10}H_{10}ClNO_2$ (percent): N, 6.62. Found (percent): N, 6.61.

The structure of this novel compound was confirmed by infrared analysis (5% carbon tetrachloride solution) showing maxima at 1730 cm.$^{-1}$ and 1664 cm.$^{-1}$ indicating carbonyl and vinyl absorptions respectively. Further identification was carried out employing NMR which showed singulet peaks at 3.08 p.p.m. and 5.28 p.p.m. and multiplet peaks at 7.5 p.p.m. confirming the presence of N-methyl, vinyl and aromatic protons, respectively. The integral proton ratio was 3:2:5.

Following the procedure described above but replacing phenol by:

thiophenol,
pyrocatechol,
resorcinol,
hydroquinone,
phloroglucinol,
2-naphthol,
p-methoxyphenol,
p-ethoxyphenol,
p-octyloxyphenol,
p-methylthiophenol,
p-octylthiophenol,
p-cyanophenol,
p-chlorophenol,
2,4-dichlorophenol,
2,4,6-trichlorophenol,
p-nitrophenol,
2,4-dinitrophenol,
2,4,6-trinitrophenol,
resorcinol monopropionate,
resorcinol monocaprylate,
hydroquinone monoacetate,
hydroquinone monopropionate,
hydroquinone monocaprylate,
pyrocatechol monoacetate,
pyrocatechol monocaprylate,
phloroglucinol diacetate, and
phloroglucinol dicaprylate, there were obtained:

phenyl N-methyl-N-(1-chlorovinyl)thiocarbamate,
1,2-di[N-methyl-N-(1-chlorovinyl)carbamoyloxy] benzene,
1,3-di[N-methyl-N-(1-chlorovinyl)carbamoyloxy] benzene,
1,4-di[N-methyl-N-(1-chlorovinyl)carbamoyloxy] benzene,
1,3,5-tri[N-methyl-N-(1-chlorovinyl)carbamoyloxy] benzene,
2-naphthyl N-methyl-N-(1-chlorovinyl)carbamate,
p-methoxyphenyl N-methyl-N-(1-chlorovinyl)carbamate,
p-ethoxyphenyl N-methyl-N-(1-chlorovinyl)carbamate,
p-octyloxyphenyl N-methyl-N-(1-chlorovinyl)carbamate,
p-methylthiophenyl N-methyl-N-(1-chlorovinyl) carbamate,
p-octylthiophenyl N-methyl-N-(1-chlorovinyl)carbamate,
p-cyanophenyl N-methyl-N-(1-chlorovinyl)carbamate,
p-chlorophenyl N-methyl-N-(1-chlorovinyl)carbamate,
2,4-dichlorophenyl N-methyl-N-(1-chlorovinyl) carbamate,
2,4,6-trichlorophenyl N-methyl-N-(1-chlorovinyl) carbamate,
p-nitrophenyl N-methyl-N-(1-chlorovinyl)carbamate,
2,4-dinitrophenyl N-methyl-N-(1-chlorovinyl) carbamate,
2,4,6-trinitrophenyl N-methyl-N-(1-chlorovinyl) carbamate,
3-propionyloxyphenyl N-methyl-N-(1-chlorovinyl) carbamate,
3-capryloxyphenyl N-methyl-N-(1-chlorovinyl) carbamate,
4-acetoxyphenyl N-methyl-N-(1-chlorovinyl)carbamate,
4-propionyloxyphenyl N-methyl-N-(1-chlorovinyl) carbamate,
4-capryloxyphenyl N-methyl-N-(1-chlorovinyl)
2-acetoxyphenyl N-methyl-N-(1-chlorovinyl)carbamate,
2-capryloxyphenyl N-methyl-N-(1-chlorovinyl) carbamate,
3,5-diacetoxyphenyl N-methyl-N-(1-chlorovinyl) carbamate and
3,5-dicapryloxyphenyl N-methyl-N-(1-chlorovinyl) carbamate, respectively.

EXAMPLE 3

Preparation of 3-tertiary-butylphenyl N-methyl-N-(1-chlorovinyl)carbamate

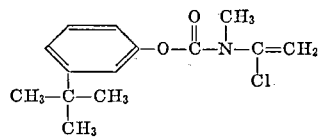

Employing the procedure described in Example 2, but substituting 3-tertiary-butylphenol for phenol, there was obtained 3-tertiary-butylphenyl N-methyl-N-(1-chlorovinyl)carbamate in the form of a liquid having a boiling point of 108° C. at 0.005 mm. of mercury pressure.

*Analysis.*—Calcd. for $C_{14}H_{18}ClNO_2$ (percent): N, 5.23. Found (percent): N, 5.24.

Confirmation of the structure of this compound was carried out employing infrared and nuclear magnetic resnance spectroscopy. The infrared spectra (5% solution in chloroform) showed maxima at 1724 cm.$^{-1}$ and 1664 cm.$^{-1}$ indicating carbonyl and vinyl absorptions respectively. The NMR spectra (30% solution in carbon tetrachloride) showed singulet peaks at 1.3 p.p.m. and at 3.12 p.p.m., and multiplet peaks at 5.3 p.p.m. and at 7.1 p.p.m. indicating the presence of the tertiary butyl-substituted phenyl, the N-methyl, the vinyl and the aromatic protons respectively. The integral proton ratio was 9:3:2:4.

Similarly, employing the procedure described in Example 2, but replacing phenol by 3-tert-butylphenyl and replacing N-methyl-N-(1-chlorovinyl)carbamoyl chloride by:

N-methyl-N-(1-chloro-1-propenyl)-,
N-methyl-N-(1-chloro-1-butenyl)-,
N-methyl-N-(1-chloro-1-nonadecenyl)-,
N-methyl-N-(1-chlorostyryl)-, N-ethyl-N-(1-chlorovinyl)-,
N-octyl-N-(1-chlorovinyl)-,
N-phenyl-N-(1-chlorovinyl)-,
N-paratolyl-N-(1-chlorovinyl)-,
N-methyl-N-(1-chloro-2,2-diphenylethenyl)-,
N-methyl-N-(1-chloroisobutenyl)-, and
N-hexyl-N-(1-chloro-p-methylstyryl)carbamoyl chlorides there were obtained:

3-t-butylphenyl N-methyl-N-(1-chloro-1-propenyl)-,
3-t-butylphenyl N-methyl-N-(1-chloro-1-butenyl)-,
3-t-butylphenyl N-methyl-N-(1-chloro-1-nonadecenyl)-,
3-t-butylphenyl N-methyl-N-(1-chlorostyryl)-,
3-t-butylphenyl N-ethyl-N-(1-chlorovinyl)-,
3-t-butylphenyl N-octyl-N-(1-chlorovinyl)-,
3-t-butylphenyl N-phenyl-N-(1-chlorovinyl)-,
3-t-butylphenyl N-paratolyl-N-(1-chlorovinyl)-,
3-t-butylphenyl N-methyl-N-(1-chloro-2,2-diphenylethenyl)-,
3-t-butylphenyl N-methyl-N-(1-chloroisobutenyl)-, and
3-t-butylphenyl N-hexyl-N-(1-chloro-p-methylstyryl)-carbamate, respectively.

EXAMPLE 4

Preparation of 4,5-dimethyl-2-chlorophenyl N-methyl-N-(1-chlorovinyl)carbamate

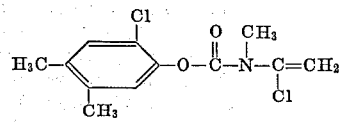

Following the procedure of Example 2, but substituting 4,5-dimethyl-2-chlorophenyl for phenol, there was obtained 4,5-dimethyl-2-chlorophenyl N-methyl-N-(1-chlorovinyl)carbamate in the form of a liquid having a boiling point of 130° C. at 0.075 mm. mercury pressure.

*Analysis.*—Calcd. for $C_{12}H_{13}ClNO_2$ (percent): N, 5.11. Found (percent): N, 5.24.

The infrared spectra (5% chloroform solution) confirmed the structure of the subject compound, which showed maxima at 1724 cm.$^{-1}$ and 1664 cm.$^{-1}$ indicating carbonyl and vinyl absorptions respectively. Further characterization of the compound was carried out by NMR using a 30% solution in carbon tetrachloride. The NMR spectra showed two singulets at 2.14 p.p.m. and 3.14 p.p.m., a multiplet at 5.32 p.p.m. and a doublet at 7.0 p.p.m. indicating aryl-substituted-methyl, N-methyl, vinyl and aromatic protons, respectively, with an integral proton ratio of 3:3:2:2.

EXAMPLE 5

Preparation of α-naphthyl N-methyl-N-(1-chlorovinyl)carbamate

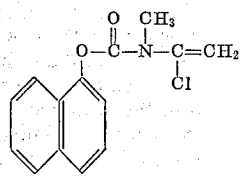

Employing the procedure of Example 2, but substituting α-naphthol for phenol there was obtained α-naphthyl N-methyl-N-(1-chlorovinyl)carbamate as a viscous amber colored liquid. This compound was characterized by infrared and NMR spectroscopy. The infrared spectra showed maxima at 1724 cm.$^{-1}$ and 1664 cm.$^{-1}$ indicating carbonyl and vinyl absorptions respectively. NMR spectra showed singulets at 3.15 p.p.m. and 5.38 p.p.m., and a multiplet between 7.2 and 8.0 p.p.m. indicating the presence of N-methyl, vinyl and aromatic protons respectively. The integral proton ratio was 3:2:7.

EXAMPLE 6

This example illustrates the preparation of α-naphthyl N-methylcarbamate, a known insecticide, by solvolysis of α-naphthyl N-methyl-N-(1-chlorovinyl)carbamate.

A solution of 1.3 grams (0.005 mole) of α-naphthyl N-methyl-N-(1-chlorovinyl)carbamate (prepared as described in Example 5) in 13 ml. of methanol was refluxed for 60 minutes. After evaporation of the solvent and trituration of the solid residue with benzene, 1.0 gram (95.5% of theory) of α-naphthyl N-methylcarbamate having a melting point of 142–143° C. was obtained. The infrared and NMR spectra of the compound were identical to those of an authentic sample of α-naphthyl N-methylcarbamate obtained from α-naphthol and methyl isocyanate. The latter preparation was carried out by adding with stirring at room temperature 11.97 grams (0.2 mole) of methyl isocyanate to a mixture of 28.8 grams (0.2 mole) of α-naphthol and 0.288 gram (1% by weight) of potassium tertiary-butoxide in 50 ml. of benzene. During the addition of methyl isocyanate an exotherm (25–55° C.) occurred. The solid which separated was isolated by filtration and recrystallized from ethanol to give 31.5 grams (78.5% of theory) of α-naphthyl N-methylcarbamate having a melting point of 132–135° C.

Following this same solvolysis procedure but replacing α-naphthyl N-methyl-N-(1-chlorovinyl)carbamate by:

α-naphthyl N-ethyl-N-(1-chlorovinyl)carbamate,
α-naphthyl N-(n-hexyl)-N-(1-chlorovinyl)carbamate,
α-naphthyl N-isopropyl-N-(1-chlorovinyl)carbamate,
α-naphthyl N-butyl-N-(1-chlorovinyl)carbamate,
α-naphthyl N-(1-naphthyl)-N-(1-chlorovinyl)carbamate,
α-naphthyl N-methyl-N-(1-chlorostyryl)carbamate,
α-naphthyl N-methyl-N-(1-chlorononadecenyl)carbamate,
α-naphthyl N-ethyl-N-(1-chloro-2,2-diphenylethenyl)carbamate,
α-naphthyl N-ethyl-N-(1-chloro-p-methylstyryl)carbamate,
p-acetylphenyl N-methyl-N-(1-chlorovinyl)carbamate,
p-tert-butylphenyl N-methyl-N-(1-chlorovinyl)carbamate, or
2,3,5-trimethylphenyl N-phenyl-N-(1-chlorovinyl)carbamate there were obtained the following:

α-naphthyl N-ethylcarbamate,
α-naphthyl N-(n-hexyl)carbamate,
α-naphthyl N-isopropylcarbamate,
α-naphthyl N-butylcarbamate,
α-naphthyl N-(1-naphthyl)carbamate,
α-naphthyl N-methylcarbamate,
α-naphthyl N-methylcarbamate,
α-naphthyl N-ethylcarbamate,
α-naphthyl N-ethylcarbamate,
p-acetylphenyl N-methylcarbamate,
p-tert-butylphenyl N-methylcarbamate and
2,3,5-trimethylphenyl N-phenylcarbamate, respectively.

These compounds are known to be useful as insecticides: see British Pat. 841,141.

EXAMPLE 7

This example shows the hydrolysis of α-naphthyl N-methyl-N-(1-chlorovinyl)carbamate.

To 10 ml. of water was added dropwise, with stirring, at room temperature (25° C.) 2.6 grams (0.01 mole) of α-naphthyl N-methyl-N-(1-chlorovinyl)carbamate (prepared as described in Example 5). After several minutes an exotherm (26–40° C.) occurred with the evolution of hydrogen chloride. The solid which separated was isolated by filtration and recrystallized from methanol to give 2.15 grams (88.5% of theory) of α-naphthyl N-methyl-N-acetylcarbamate having a melting point of 101°–102° C. The infrared spectra showed maxima at 1748 cm.$^{-1}$ and 1689 cm.$^{-1}$ indicating carbonyl absorption. NMR spectra showed singulets at 2.55 p.p.m. and 3.48 p.p.m.

indicating the presence of acetyl and N-methyl protons respectively. Further hydrolysis of the α-naphthyl N-methyl-N-acetylcarbamate in the presence of acid or base afforded the corresponding α-naphthyl N-methyl carbamate.

Employing this same procedure but replacing α-naphthyl N-methyl-N-(1-chlorovinyl)carbamate by:

α-naphthyl N-ethyl-N-(1-chlorovinyl)carbamate,
α-naphthyl N-(n-hexyl)-N-(1-chlorovinyl)carbamate,
α-naphthyl N-isopropyl-N-(1-chlorovinyl)carbamate,
α-naphthyl N-butyl-N-(1-chlorovinyl)carbamate,
α-naphthyl N-(1-naphthyl)-N-(1-chlorovinyl)carbamate,
α-naphthyl N-methyl-N-(1-chlorostyryl)carbamate,
α-naphthyl N-methyl-N-(1-chlorononadecenyl) carbamate,
α-naphthyl N-ethyl-N-(1-chloro-2,2-diphenylethenyl) carbamate,
α-naphthyl N-ethyl-N-(1-chloro-p-methylstyryl) carbamate,
p-acetoxy-phenyl N-methyl-N-(1-chlorovinyl)carbamate,
p-tert-butylphenyl N-methyl-N-(1-chlorovinyl)carbamate, or
2,3,5-trimethylphenyl N-phenyl-N-(1-chlorovinyl) carbamate there were obtained the following intermediate carbamates:

α-naphthyl N-ethyl-N-acetylcarbamate,
α-naphthyl N-(n-hexyl)-N-acetylcarbamate,
α-naphthyl N-isopropyl-N-acetylcarbamate,
α-naphthyl N-butyl-N-acetylcarbamate,
α-naphthyl N-(1-naphthyl)-N-acetylcarbamate,
α-naphthyl N-methyl-N-phenacetylcarbamate,
α-naphthyl N-methyl-N-nonadecanoylcarbamate,
α-naphthyl N-ethyl-N-diphenylacetylcarbamate,
α-naphthyl N-ethyl-N-paramethylphenacetylcarbamate,
p-acetoxyphenyl N-methyl-N-acetylcarbamate,
p-tertiary-butylphenyl N-methyl-N-acetylcarbamate, and
2,3,5-trimethylphenyl N-phenyl-N-acetylcarbamate.

Upon further hydrolysis of the above carbamates there were obtained the following:

α-naphthyl N-ethylcarbamate,
α-naphthyl N-(n-hexyl)carbamate,
α-naphthyl N-isopropylcarbamate,
α-naphthyl N-butylcarbamate,
α-naphthyl N-(1-naphthyl)carbamate,
α-naphthyl N-methylcarbamate,
α-naphthyl N-methylcarbamate,
α-naphthyl N-ethylcarbamate,
α-naphthyl N-ethylcarbamate,
p-acetylphenyl N-methylcarbamate,
p-tert-butylphenyl N-methylcarbamate and
2,3,5-trimethylphenyl N-phenylcarbamate, respectively.

INSECTICIDAL COMPOSITIONS

Since the majority of the novel insecticidally active compounds (I) of the invention are liquids they can be used for insecticidal purposes in their pure state. However, for practical and economic reasons it is preferred that they be formulated and used as insecticidal compositions. Such insecticidal compositions generally comprise an admixture of the active aryl N-substituted-N-(1-chlorovinyl)carbamate (I) and a diluent, preferable a dispersible insecticide carrier of the kind commonly employed in the art, with or without adjuvants.

For example, insecticidal compositions useful against insects which infest plants can be formulated as dusts, wettable powders, emulsifiable concentrates, aqueous dispersions, solutions and the like for application to foliage, seeds or other parts of plants. Moreover, the active agents of the invention can be used alone in the compositions, or they can be used in combination with other insecticidal, fungicidal, vircidal or bactericidal agents.

It is usually desirable, particularly in the case of foliar spray formulations, to include adjuvants such as wetting agents, spreading agents, dispersing agents, stickers, adhesives and the like in accordance with usual agricultural practices. Any of the conventional wetting and dispersing agents of the anionic, cationic, and nonionic types that are commonly employed in compositions for application to plants can be used. Surfactants having sufficient wetting activity suitable for the compositions of this invention include alkyl sulfates and sulfonates, alkyl and arylsulfonates, sulfosuccinate esters, polyoxyethylene sulfates, polyoxyethylenesorbitan monolaurate, alkyl and aryl polyether sulfates, alkyl and aryl polyether alcohols, alkyl quaternary ammonium salts, sulfated fatty acid esters, sulfated fatty acid amides, glycerol mannitan laurate, polyalkylether condensates of fatty acids, lignin sulfonates, and the like. It will be understood, of course, that the sulfate and sulfonate compounds suggested above will preferably be used in the form of their soluble salts, (e.g. sodium salts). All of these surfactants are capable of reducing the surface tension of water to less than about 40 dynes per centimeter in concentrations of about 1% or less.

The insecticidal dust compositions of the invention comprise a dispersion of the aryl N-substituted-N-(1-chloro-1-alkenyl)carbamates (I) of the invention in an inert dusting powder. The term "dusting powder" as used throughout this specification and claims thereof means a solid material comminuted so as to have an average particle size of less than 50 microns and preferably less than 15 microns. Typical of such dusting powders are: pyrophyllite, diatomite, infusorial earth, fullers' earth, clays such as bentonite, Georgia clay, Attapulgus clay, Barden clay, wood or walnut shell flour, cotton seed flour and the like dusting powders. The amount of aryl N-substituted-N-(1-chloro-1-alkenyl)carbamate (I) formulated in a dusting powder is advantageously about 0.1% to about 50% by weight, and preferably about 1% to about 20% by weight. Illustratively, an insecticidal dusting composition is obtained by blending approximately equal parts by weight of the active ingredient and pyrophyllite, comminuting before or after the admixture as desired. A wettable powder suitable for dispersing in an aqueous vehicle is obtained by including a surfactant with the dusting powder. Suitable surfactants include sodium lauryl sulfate, sodium and calcium lignosulfonates, 1-tetradecyl-4-methylpyridinium chloride, isooctylphenoxy polyethoxy ethanol, and ethylene oxide-propylene glycol condensates. If desired the surfactant can be incorporated in the dry mixture either by dry milling or by adding it as a solution in a volatile solvent such as ethanol or acetone, mixing to form a paste, drying, and milling. These surfactants are generally employed in an amount corresponding to about 0.5 to about 5% by weight of the total composition.

For convenience in handling, the active compounds of the invention can be prepared with or without adjuvants in the form of concentrated solutions in a solvent, for example, toluene, xylene, acetone, benzene, ethyl acetate, dimethylformamide, dimethylacetamide, dimethylsulfoxide, acetonitrile, cyclohexanone or similar solvents. Such concentrates can be dispersed in a suitable volume of an aqueous medium in the presence of a surfactant such as those disclosed above to give a mixture of any desired concentration. The surfactant can be included in the concentrated solution of the active ingredient to give an emulsifiable concentrate, or it can be added separately when the aqueous dispersion is being prepared. For the most part, mixtures containing very low concentrations of the active ingredients (I) are effective.

Illustratively, the concentration of the aryl N-substituted-N-(1-chloro-1-alkenyl)carbamates (I) can range from about 10 to about 10,000 p.p.m., depending upon the amount of material applied per acre. Preferably, the concentration of the compound of Formula I in the novel insecticidal compounds of the invention is within the range of about 500 to about 5,000 p.p.m. For example, excellent control of Mexican bean beetle has been obtained using concentrations of active ingredient ranging from about 500 p.p.m. to about 1,000 p.p.m.

The active compounds (I) of the invention can also be formulated in relatively dilute proportions in a dispersible insecticide carrier for household applications. Thus, the active compounds (I) can be formulated in dusts having from about 0.1% to about 50% active ingredients with a dusting powder as hereinabove described. Similarly, the aryl N-substituted-N-(1-chloro-1-alkenyl)carbamates of Formula I can be formulated with deodorized kerosene for aerosol applications containing from about 0.1% to about 5% active ingredients.

It will, of course, be appreciated that the conditions encountered when applying the method and compositions of this invention to actual practice can vary widely. Included among the variables that may be encountered are the degree of infestation by insects, the particular insect to be controlled, the particular plant being treated, the degree of development of the plant, the prevailing weather conditions, such as temperature, relative humidity, rainfall, dews and so forth.

The compounds of the invention have been found to be particularly effective insecticides against a variety of insects as illustrated in the following examples.

TESTING PROCEDURES (1) Contact test

One hundred milligrams of the test compound were dissolved in 10 milliliters of acetone and diluted with distilled water containing 0.0132% by volume of a polyoxyalkylene adduct of a long chain fatty acid partial ester of hexatol anhydride (Tween 20) emulsifying agent. The resultant 1,000 p.p.m. (weight per volume) formulation was then used as prepared or further diluted with the above aqueous solution for testing at lower concentrations. For all direct contact tests the test compositions were applied using a DeVilbiss spray gun (The DeVilbiss Company, Toledo, Ohio). A control experiment was conducted in each case to determine the effect of a 10% (volume:volume) acetone solution of the above water solution against the test species. All test species were randomly selected from large insect populations. The following insects were used in this experiment:

Third-instar nymphs of the house cricket (*Acheta domesticus* Linnaeus), obtained from Top Hat Cricket, Kalamazoo, Mich. and hold on dry dog food and water, were the test insects. Ten crickets were anesthetized with diethyl ether and placed in a 5-inch diameter cage screened at both ends and fitted with a plug. The crickets were held for one hour prior to testing to insure their complete recovery from the anesthesia. The insects were sprayed with the test formulation by directing the spray through the cage. The insects were held for 48 hours at 72–74° F. on water alone. House crickets which were unable to walk upon probing were considered dead.

Four-five day old adults of the house fly (*Musca domestica* Linnaeus), reared on CSMA media (Ralston Purina Company, St. Louis, Mo.) were the test insects. Ten flies were anesthetized with diethyl ether and placed in a ½ pint ice cream carton with a screen top. The flies were held one hour prior to testing to insure their complete recovery from the anesthesia. The flies were sprayed with the test formulation such that the surface of the carton contained a thin film of moisture. The insects were held for 24 hours at 72–74° F. on a 10% (weight:volume) sugar-water solution. Flies which were unable to walk were considered dead.

Third-instar larvae of the Mexican bean beetle (*Epilachna varivestis* Mulsant), reared on Pinto bean plants, were the test insects. Two bean leaves placed on a moistened filter paper in a 9-cm. Petri dish along with 5 beetle larvae were sprayed with the test formulation such that the upper surfaces of the leaves contained a thin film of moisture. The dish was closed. The insects were held for 48 hours at 72–74° F. and no additional food was offered. Larvae which were unable to walk upon probing were considered dead.

Adults of the boll weevil (*Anthonomus grandis* Boheman), obtained from the National Cotton Council, Memphis, Tenn. and held on cotton saturated with 10% (weight:volume) sugar-water were the test insects. Ten adult boll weevils were anesthetized with $CO_2$ and placed in a 9-cm. Petri dish. The weevils were held for one hour prior to testing to insure their complete recovery from the effects of the anesthesia. The weevils were sprayed with the test formulation such that the surface of the dish contained a thin film of moisture. The dish was then closed. The insects were held for 24 hours at 72–74° F. without food or water. Boll weevils which were unable to maintain an upright position upon probing were considered dead.

Adults of the confused flour beetle (*Tribolium confusem* Jacquelin de Val), reared on a 64:1 (volume:volume) mixture of whole wheat flour and brewer's yeast, were the test insects. Ten flour beetles were placed in a 9-cm. Petri dish and treated as described for the boll weevil. The insects were held for 48 hours at 72–74° F. without food or water. Flour beetles which were unable to maintain an upright position upon probing were considered dead.

(2) Potter tower test

The test compounds were dissolved in a 5% (volume:volume) acetone solution of olive oil making a final concentration of 0.1% (weight:volume) solution of test chemical. Five milliliter aliquots of the test solutions were sprayed through a Potter Tower (Burkard Manufacturing Company, Ltd., Rickmansworth, Hertfordshire, England) operating at 5 mm. mercury pressure. The test solutions were sprayed either directly on to excised lima bean leaves or on to several insects of the same species. The insects and leaves were placed on Whatman No. 4 filter paper in a 9-cm. Petri dish for the spraying operation. Four five-day old adult house flies were sprayed under diethyl ether anesthesia while 30-day old nymphal house crickets were sprayed under carbon dioxide anesthesia. The insects were held for one hour prior to testing to insure their complete recovery from the anesthesia. Immediately following the treatment the insects were transferred to clean holding containers and mortality counts assessed 24 hours of the treatment (see above for mortality assessment). Only the house flies were offered food during the holding period (10% sugar in water). Second-instar Mexican bean beetle larvae were placed on treated excised lima bean leaves which had been placed in a Petri dish containing a moistened filter paper. Mortality was assessed, as above, 24 hours post-treatment.

Table I summarizes the percentage mortality caused by representative compounds (I) of the invention in the various contact tests set forth above.

TABLE I.—CONTACT TESTS

| Compound | Concentration, p.p.m. | Test organisms, percent mortality | | | | |
| --- | --- | --- | --- | --- | --- | --- |
| | | House cricket | House fly | Mexican bean beetle | Boll weevil | Confused flour beetle |
| Phenyl N-methyl-N-(1-chlorovinyl)carbamate | 1,000 | 100 | 50 | | | 0 |
| 3-tertiary-butylphenyl N-methyl-N-(1-chlorovinyl)carbamate | 500 | 100 | 100 | 100 | 40 | 50 |
| | 1,000 | 100 | 100 | | | 100 |
| α-naphthyl N-methyl-N-(1-chlorovinyl)carbamate | 1,000 | 100 | 0 | | | 0 |
| 4,5-dimethyl-2-chlorophenyl N-methyl-N-(1-chlorovinyl)carbamate | 1,000 | 100 | 0 | | | 10 |

As can be seen from Table I, above, the novel compounds (I) of the invention are insecticidally active toward a variety of insects. To further illustrate this activity the Potter Tower test, described above, was conducted employing representative compounds (I) of the invention. Table II illustrates the percentage kill of 4–5-day old adult house flies, adult boll weevils and second-instar Mexican bean beetle caused by representative compounds (I) of the invention in this test.

TABLE II.—POTTER TOWER TEST

| Compound | Concentration, p.p.m. | Boll weevil | House fly | Mexican bean beetle |
|---|---|---|---|---|
| 3-t-butyl phenyl N-methyl-N-(1-chlorovinyl)carbamate | 1,000 | 0 | 0 | 100 |
| α-Naphthyl N-methyl-N-(1-chlorovinyl)-carbamate | 1,000 | 0 | 0 | 100 |
| 4,5-dimethyl-2-chlorophenyl N-methyl-N-(1-chlorovinyl)-carbamate | 1,000 | 10 | 10 | 100 |

What is claimed is:

1. A compound of the formula:

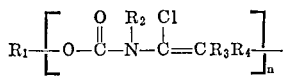

wherein $n$ is an integer from 1 to 2, $R_1$ has a valency corresponding to the value of $n$ and is selected from the class consisting of aryl and substituted aryl, $R_2$ is selected from the class consisting of lower-alkyl, aryl and substituted aryl, $R_3$ and $R_4$ are selected from the class consisting of hydrogen, alkyl containing from 1 to 18 carbon atoms, aryl and substituted aryl, and wherein aryl in each instance is selected from the group consisting of phenyl and naphthyl and wherein the substituents in said substituted aryl in each instance are selected from the class consisting of lower-alkyl, lower-alkoxy, lower-alkylthio, lower-alkanoyloxy, halo, nitro, and cyano.

2. A compound of the formula:

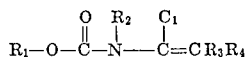

wherein $R_1$ is selected from the class consisting of aryl and substituted aryl, $R_2$ is selected from the class consisting of lower-alkyl, aryl and substituted aryl, $R_3$ and $R_4$ are selected from the class consisting of hydrogen, alkyl containing from 1 to 18 carbon atoms, aryl and substituted aryl, and wherein aryl in each instance is selected from the group consisting of phenyl and naphthyl and wherein the substituents in said substituted aryl in each instance are selected from the class consisting of lower-alkyl, lower-alkoxy, lower-alkylthio, lower-alkanoyloxy, halo, nitro and cyano.

3. A compound of the formula:

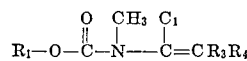

wherein $R_1$ is selected from the class consisting of aryl and substituted aryl, $R_3$ and $R_4$ are selected from the class consisting of hydrogen, alkyl containing 1 to 18 carbon atoms, aryl and substituted aryl, and wherein aryl in each instance is selected from the group consisting of phenyl and naphthyl and wherein the substituents in said substituted aryl in each instance are selected from the class consisting of lower-alkyl, lower-alkoxy, lower-alkylthio, lower-alkanoyloxy, halo, nitro and cyano.

4. A compound of the formula:

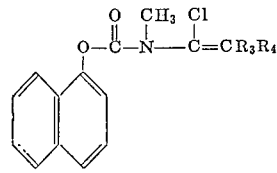

wherein $R_3$ and $R_4$ are selected from the class consisting of hydrogen, alkyl containing 1 to 18 carbon atoms, aryl and substituted aryl; wherein aryl in each instance is selected from the group consisting of phenyl and naphthyl and wherein the substituents of said substituted aryl in each instance are selected from the class consisting of lower-alkyl, lower-alkoxy, lower-alkylthio, lower-alkanoyloxy, halo, nitro and cyano.

5. A compound of the formula:

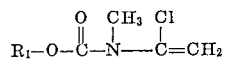

wherein $R_1$ is selected from the class consisting of aryl and substituted aryl, said aryl in each instance being selected from the group consisting of phenyl and naphthyl and said aryl substituents being selected from the class consisting of lower-alkyl, lower-alkoxy, lower-alkylthio, lower-alkanoyloxy, halo, nitro and cyano.

6. A compound according to claim 2 wherein $R_1$ is phenyl, $R_2$ is methyl, and $R_3$ and $R_3$ each represent hydrogen; the compound being phenyl N-methyl-N-(1-chlorovinyl)carbamate.

7. A compound according to claim 2 wherein $R_1$ is alpha-naphthyl, $R_2$ is methyl, and $R_3$ and $R_4$ each represent hydrogen; the compound being alpha-naphthyl N-methyl-N-(1-chlorovinyl)carbamate.

8. A compound according to claim 2 wherein $R_1$ is 3-tertiary-butyl phenyl, $R_2$ is methyl, and $R_3$ and $R_4$ are each hydrogen; the compound being 3-tertiary-butylphenyl N-methyl-N-(1-chlorovinyl)carbamate.

9. A compound according to claim 2 wherein $R_1$ is 4,5-dimethyl-2-chlorophenyl, $R_2$ is methyl, and $R_3$ and $R_4$ each represent hydrogen; the compound being 4,5-dimethyl - 2 - chlorophenyl N-methyl-N-(1-chlorovinyl)-carbamate.

References Cited

UNITED STATES PATENTS 3,442,889  5/1969  D'Amcoi _____ 260—482 X
3,458,639  7/1969  Heiss et al. _____ 260—482 X LORRAINE A. WEINBERGER, Primary Examiner P. J. KILLOS, Assistant Examiner U.S. Cl. X.R.

260—455 A, 465 D, 470, 471 C, 544 C; 424—300